(12) United States Patent
Klein

(10) Patent No.: US 11,401,711 B2
(45) Date of Patent: Aug. 2, 2022

(54) MULTILAYER FIRE SAFETY TAPE AND RELATED FIRE RETARDANT BUILDING CONSTRUCTION FRAMING MEMBERS

(71) Applicant: James Alan Klein, Redmond, WA (US)

(72) Inventor: James Alan Klein, Bellevue, WA (US)

(\*) Notice: Subject to any disclaimer, the term of this patent is extended or adjusted under 35 U.S.C. 154(b) by 0 days.

(21) Appl. No.: 15/675,332

(22) Filed: Aug. 11, 2017

(65) Prior Publication Data

US 2018/0283000 A1 Oct. 4, 2018

Related U.S. Application Data

(60) Provisional application No. 62/601,747, filed on Mar. 31, 2017, provisional application No. 62/602,687, filed on May 3, 2017, provisional application No. 62/602,685, filed on May 3, 2017.

(51) Int. Cl.
| | |
|---|---|
| *E04B 1/94* | (2006.01) |
| *B32B 7/12* | (2006.01) |
| *B32B 5/18* | (2006.01) |
| *B32B 9/04* | (2006.01) |
| *B32B 7/06* | (2019.01) |

(52) U.S. Cl.
CPC .............. *E04B 1/948* (2013.01); *B32B 5/18* (2013.01); *B32B 7/06* (2013.01); *B32B 7/12* (2013.01); *B32B 9/045* (2013.01); *B32B 9/046* (2013.01); *E04B 1/947* (2013.01); *B32B 2266/025* (2013.01); *B32B 2266/08* (2013.01); *B32B 2307/3065* (2013.01); *B32B 2307/72* (2013.01)

(58) Field of Classification Search
None
See application file for complete search history.

(56) References Cited

U.S. PATENT DOCUMENTS

| | | |
|---|---|---|
| 3,934,066 A | 1/1976 | Murch |
| RE31,428 E | 10/1983 | Pedlow |
| 4,839,223 A | 6/1989 | Tschudin-Mahrer |
| 5,127,760 A | 7/1992 | Brady |
| 5,130,199 A * | 7/1992 | Howard ............... C04B 35/536 428/323 |

(Continued)

FOREIGN PATENT DOCUMENTS

CA 2234347 A1 10/1999

*Primary Examiner* — Chinessa T. Golden
(74) *Attorney, Agent, or Firm* — Thomas E. Loop

(57) ABSTRACT

A multi-layer fire safety tape comprising a flexible closed-cell polymer foam layer adjoined to a flexible intumescent material layer is disclosed, including methods of making and using the same. The multi-layer fire safety tape is preferably composed of, in series, a flexible backing/release layer; a flexible closed-cell polymer foam thermal barrier layer; a first adhesive interface layer between the backing/release layer and the closed-cell polymer foam thermal barrier layer; a flexible intumescent material layer; a second adhesive interface layer between the intumescent material layer and the closed-cell polymer foam thermal barrier layer; and a flexible outer protective layer. In further embodiments, the multi-layer fire safety tape of the present invention further comprises a second closed-cell polymer foam layer adjacent to the intumescent material layer and/or the outer protective layer.

12 Claims, 6 Drawing Sheets

(56) References Cited

U.S. PATENT DOCUMENTS

| | | | |
|---|---|---|---|
| 5,258,216 A | * | 11/1993 | von Bonin ............... B32B 5/30 |
| | | | 428/102 |
| 5,562,957 A | | 10/1996 | Viking |
| 5,921,041 A | | 7/1999 | Ergi, II |
| 6,207,085 B1 | | 3/2001 | Ackerman |
| 7,681,365 B2 | | 3/2010 | Klein |
| 7,814,718 B2 | | 10/2010 | Klein |
| 7,866,108 B2 | | 1/2011 | Klein |
| 8,056,293 B2 | | 11/2011 | Klein |
| 8,136,314 B2 | | 3/2012 | Klein |
| 8,151,526 B2 | | 4/2012 | Klein |
| 8,181,404 B2 | | 5/2012 | Klein |
| 8,444,790 B2 | | 5/2013 | Tong |
| 8,468,759 B2 | | 6/2013 | Klein |
| 8,938,922 B2 | | 1/2015 | Pilz et al. |
| 8,973,319 B2 | | 3/2015 | Pilz et al. |
| 9,045,899 B2 | | 6/2015 | Pilz et al. |
| 9,127,454 B2 | | 9/2015 | Pilz et al. |
| 9,145,987 B2 | | 9/2015 | Muenzenberger |
| 9,284,730 B2 | | 3/2016 | Klein |
| 9,290,932 B2 | | 3/2016 | Pilz et al. |
| 9,290,934 B2 | | 3/2016 | Pilz et al. |
| 9,371,644 B2 | | 6/2016 | Pilz et al. |
| 9,458,628 B2 | | 10/2016 | Pilz et al. |
| 9,481,998 B2 | | 11/2016 | Pilz et al. |
| 9,523,193 B2 | | 12/2016 | Pilz |
| 9,551,148 B2 | | 1/2017 | Pilz |
| 9,616,259 B2 | | 4/2017 | Pilz et al. |
| 9,637,914 B2 | | 5/2017 | Pilz et al. |
| 9,683,364 B2 | | 6/2017 | Pilz |
| 9,739,052 B2 | | 8/2017 | Pilz et al. |
| 9,739,054 B2 | | 8/2017 | Pilz et al. |
| 9,752,318 B2 | | 9/2017 | Pilz |
| 9,879,421 B2 | | 1/2018 | Pilz |
| 9,909,282 B2 | | 3/2018 | Pilz |
| 2005/0176833 A1 | | 8/2005 | Tay |
| 2006/0137293 A1 | | 6/2006 | Klein |
| 2006/0155047 A1 | * | 7/2006 | Ishiguro ................. C09J 7/24 |
| | | | 524/543 |
| 2009/0049781 A1 | | 2/2009 | Pilz et al. |
| 2010/0170171 A1 | | 7/2010 | Klein |
| 2010/0170172 A1 | | 7/2010 | Klein |
| 2010/0203323 A1 | * | 8/2010 | Terada ................. B08B 7/0028 |
| | | | 428/332 |
| 2011/0099928 A1 | | 5/2011 | Klein et al. |
| 2011/0146180 A1 | | 6/2011 | Klein |
| 2011/0167742 A1 | | 7/2011 | Klein |
| 2011/0214371 A1 | | 9/2011 | Klein |
| 2013/0017389 A1 | * | 1/2013 | Tamura ...................... C09J 7/26 |
| | | | 428/314.4 |
| 2013/0104474 A1 | | 5/2013 | Klein |
| 2013/0206327 A1 | * | 8/2013 | Tach ......................... C09J 7/00 |
| | | | 156/192 |
| 2013/0280535 A1 | | 10/2013 | Maas et al. |
| 2013/0344276 A1 | * | 12/2013 | Seitz ......................... C09J 7/00 |
| | | | 428/41.8 |
| 2014/0154492 A1 | | 6/2014 | Traser et al. |
| 2016/0108292 A1 | * | 4/2016 | Yamakami ................ C09J 7/29 |
| | | | 428/220 |
| 2016/0208484 A1 | * | 7/2016 | Pilz ........................ E04F 13/00 |
| 2017/0165509 A1 | | 6/2017 | Foerg et al. |
| 2017/0234010 A1 | | 8/2017 | Klein |

\* cited by examiner

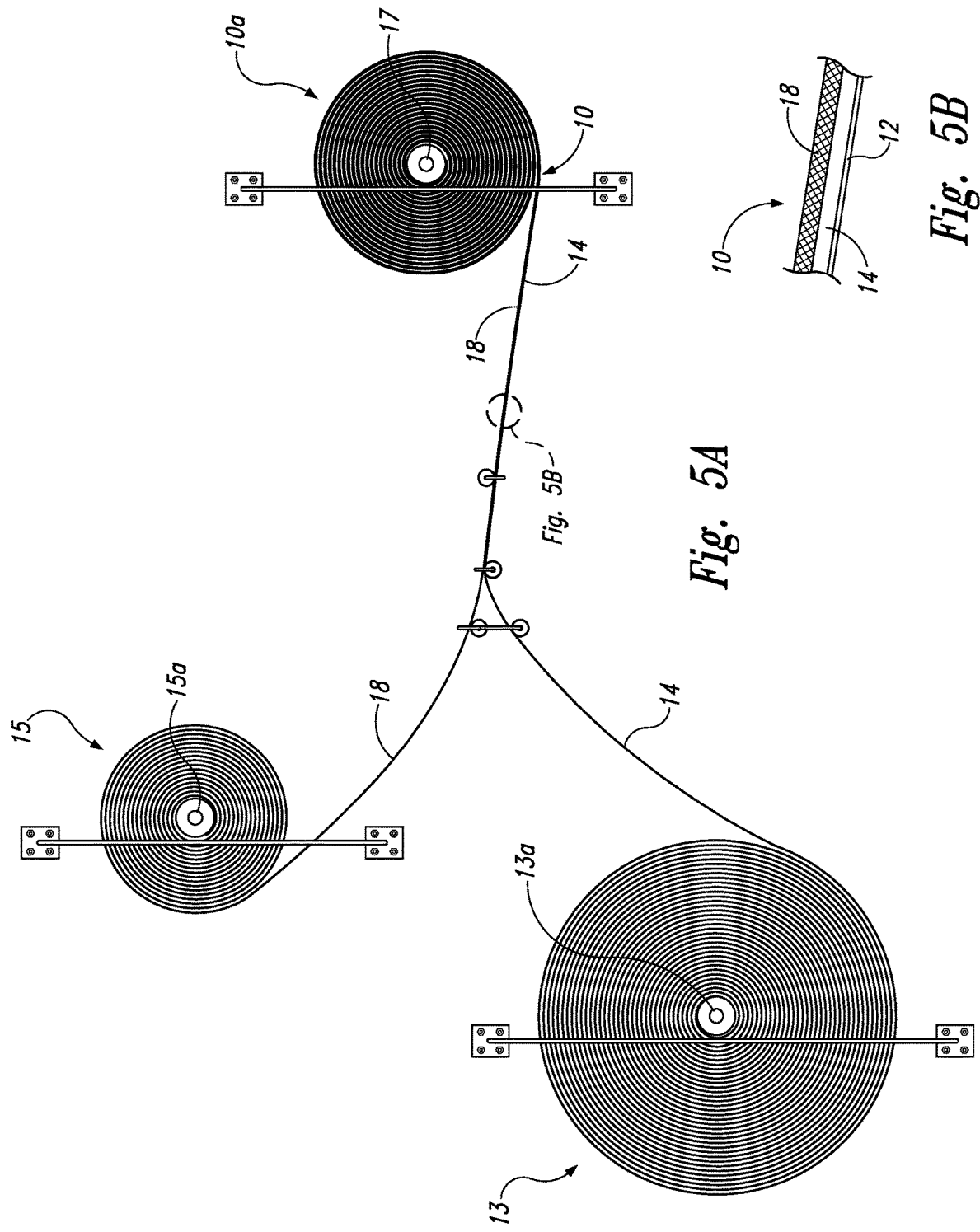

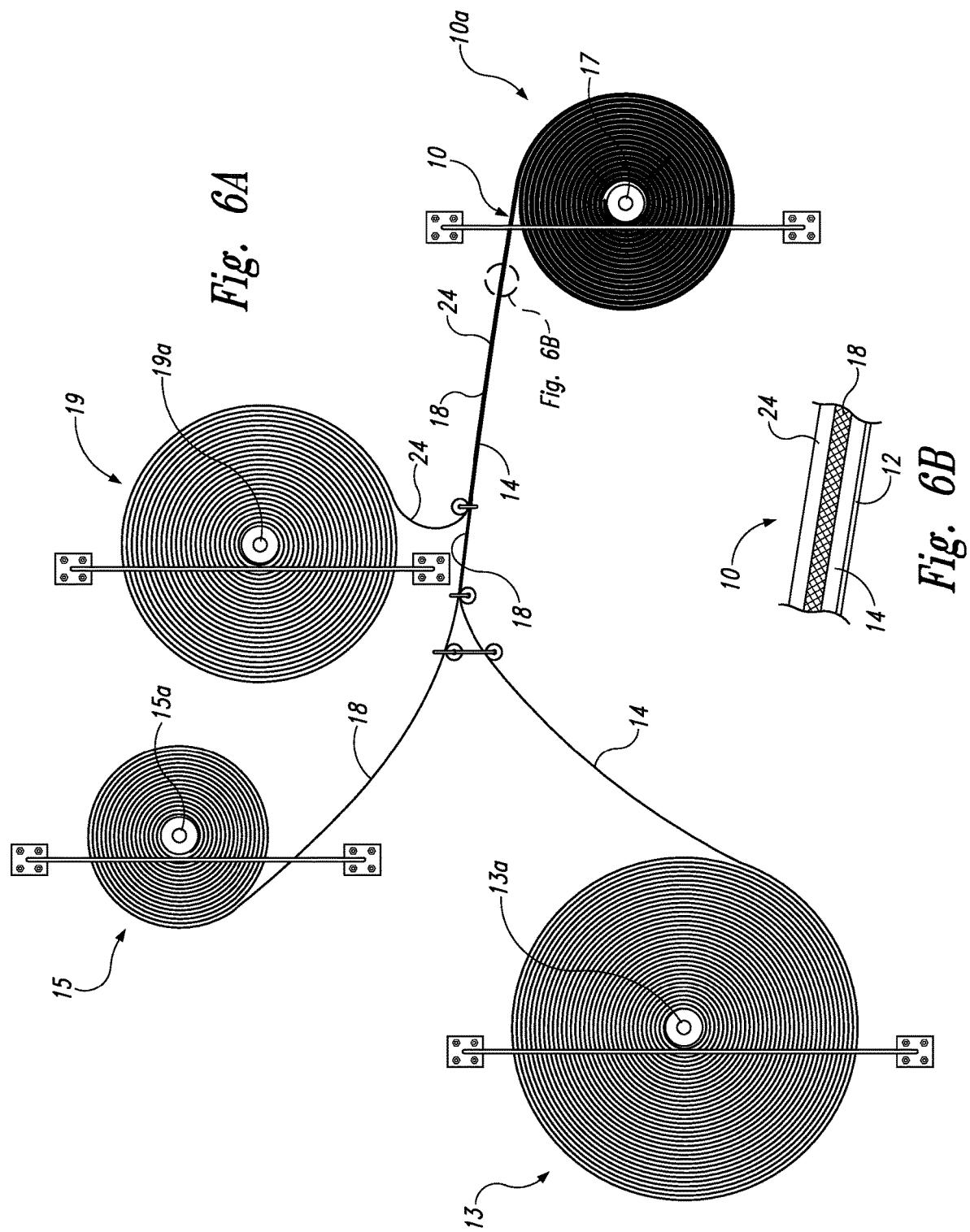

MULTILAYER FIRE SAFETY TAPE AND RELATED FIRE RETARDANT BUILDING CONSTRUCTION FRAMING MEMBERS

CROSS-REFERENCE TO RELATED APPLICATIONS

This application claims the benefit of U.S. Provisional Application No. 62/601,747 filed on Mar. 31, 2017, U.S. Provisional Application No. 62/602,687 filed on May 3, 2017, and U.S. Provisional Application No. 62/602,685 filed on May 3, 2017, with all three provisional applications being incorporated herein by reference in their entireties for all purposes.

TECHNICAL FIELD

The present invention relates generally to building construction fire blocking systems and, more particularly, to fire blocking sealing systems and methods used to seal linear construction joints (for purposes of impeding the transmission of fire and smoke in the event of a building fire).

BACKGROUND OF THE INVENTION

In the building construction industry, a head-of-wall joint (also sometimes referred to as a top-of-wall joint) refers to the linear junction or interface existing between a top section of a wall assembly and the ceiling (where the ceiling may be a next-level flat concrete floor or a corrugated pan roof deck, for example). Similarly, an expansion joint refers to the linear junction existing between adjacent wall (or ceiling) sections (such as adjacent pieces of wallboard, for example). The proper sealing of linear junctions, including head-of-wall joints and expansion joints, during the building construction phase is critically important to prevent or reduce the spread of fire and smoke in the event of a building fire.

As appreciated by contractors in the building construction industry, there are two primary methods used for sealing linear junctions (e.g., head-of-wall joints and expansion joints) against the spread of fire and smoke; namely, (1) the application of a firestop intumescent sealant (in the form of either a caulk or spray) along and into the linear joint, or (2) the installation of specialty tracks and/or other suitable framing members that have a pre-applied intumescent tape appropriately placed on (i.e., in physical contact with) the track or other suitable framing member such that the intumescent tape seals the linear construction joint. These two known methods have both been tested and approved by Underwriter Laboratories, Inc. (("UL"—an independent worldwide testing and regulatory compliance certification organization) as being compliant with certain specified fire and hose stream test standards presently in existence.

More specifically, UL has tested and certified various building construction "joint systems" in accordance with their testing standards as set forth in, for example, document "UL 2079 Tests for Fire Resistance of Building Joint Systems, fifth edition (Aug. 26, 2015)." These UL fire tests described here are applicable to building construction joint systems (assemblies) of various materials and construction (intended for use at linear junctions between adjacent fire resistive structures). UL's joint system fire tests are intended to evaluate the length of time that a specified joint system will contain a fire during a predetermined test exposure. UL's joint system fire tests evaluate the joint system's resistance to heat and, in some instances, to a hose stream, while carrying an applied load (if the assembly is load bearing). UL's joint system fire tests may, in some instances, include an air leakage test to determine the rate of air leakage through joint systems resulting from a specified air pressure difference applied across the surface of the joint system.

For example, and under current UL's requirements, a joint system may be subjected to a controlled fire exposure that achieves specified temperatures throughout a specified period. Some joint systems are cycled through their intended range of movement prior to fire exposure (to demonstrate that the joint system's range of movement and the impact of the joint system during movement on the adjacent fire resistive structures). Joint systems are often required to be loaded to their designed live load capacity during the fire test. For tests involving wall-to-wall and head-of-wall joint systems, the fire test is typically followed by a hose stream test. UL's joint system fire tests and related requirements are intended to provide a relative measure of fire performance of comparable assemblies under specified fire exposure conditions.

In the building construction industry, metal framing assemblies are commonly used to construct commercial and residential buildings. Metal framing assemblies are generally constructed from a plurality of metal framing members including studs, joists, trusses, and other metal posts and beams formed from sheet metal (and frequently fabricated to have the same general cross-sectional dimensions as standard wood members used for similar purposes). Metal framing members are typically constructed by either brake-pressing or roll-forming (with both methods being referred to as "cold-formed" processes) 12 to 24 gauge galvanized sheet steel. Although many cross-sectional shapes are available, the primary shapes used in building construction are C-shaped studs and U-shaped tracks. For example, most wall assemblies are made from opposing cold-formed slotted U-shaped tracks fastened to the floor and ceiling, and a plurality of a cold-formed C-shaped studs laterally spaced apart and positioned between the opposing tracks. Head-of-wall linear joints associated with these types of joint systems are of especially importance in terms of sealing against the spread of fire and smoke.

Although some progress has been made in recent years, there is still a need in the art for new and improved fire blocking sealant systems and methods—including innovative building construction specialty products that better seal linear construction joints (for purposes of impeding the transmission of fire and smoke in the event of a building fire). The present invention fulfills these needs and provides for further related advantages.

SUMMARY OF THE INVENTION

In brief, the present invention is directed to a new type of multi-layer fire safety tape that better and more economically seals linear construction joints. In one embodiment, the multi-layer fire safety tape is preferably composed of, in series, a flexible backing/release layer; a flexible closed-cell polymer foam thermal barrier layer; a first adhesive interface layer between the backing/release layer and the closed-cell polymer foam thermal barrier layer; a flexible intumescent material layer; a second adhesive interface layer between the intumescent material layer and the closed-cell polymer foam thermal barrier layer; and a flexible outer protective layer. In further embodiments, the multi-layer fire safety tape of the present invention further comprises a second closed-cell polymer foam layer adjacent to the intumescent material layer and/or the outer protective layer. As disclosed herein, the multi-layer fire safety tapes of the present invention may take the form of a flexible and resilient multi-layered flat strip or may be in the form of a multi-layered roll (and thus may be unwound and applied to linear building construction joints in the field as needed or on tracks/framing members at the factory).

In other embodiments, the present invention is directed to a multi-layer fire safety tape comprising a flexible closed-cell polymer foam layer adjoined to a flexible intumescent material layer.

In still other embodiments, the present invention is directed to apparatuses and methods useful for making a multi-layer fire safety tape. A first method comprises at least the steps of providing a first roll of a flexible double-coated closed-cell polymer foam sheet (or strip) about a first spool, wherein the double-coated closed-cell polymer foam sheet (or strip) is on an interleaving first wound backing/release sheet (or strip); providing a second roll of a flexible intumescent material sheet (or strip) about a second spool, wherein the wound intumescent material sheet (or strip) includes an outer flexible protective layer; providing a third spool; connecting the double-coated closed-cell polymer foam sheet (or strip) to the intumescent material sheet (or strip) at the third spool; winding about the third spool the double-coated closed-cell polymer foam sheet (or strip) together with the intumescent material sheet (or strip), while unwinding the first and second rolls, to thereby yield the roll of the multi-layer fire safety tape. The method may further comprise the step of providing a third roll of a flexible single side-coated closed-cell polymer foam sheet (or strip) about a fourth spool; connecting the single sided-coated closed-cell polymer foam sheet (or strip) to the intumescent material sheet (or strip) and to the single side-coated closed-cell polymer foam sheet (or strip) at the third spool; and winding about the third spool the double-coated closed-cell polymer foam sheet (or strip) together with the intumescent material sheet (or strip) and together with the single side-coated closed-cell polymer foam sheet (or strip), while unwinding the first and second and third rolls, to thereby yield the roll of the multi-layer fire safety tape.

In still other further embodiments, the present invention is directed to header tracks (generally U-shaped sheet metal header tracks, for example) and other framing members (control joint backers and L-shaped members, for example) having the inventive multi-layer fire safety tape applied thereto.

These and other aspects of the present invention will become more evident upon reference to the following detailed description and attached drawings. It is to be understood, however, that various changes, alterations, and substitutions may be made to the specific embodiments disclosed herein and still be within the scope of the present invention.

BRIEF DESCRIPTION OF THE DRAWINGS

The drawings are intended to be illustrative and symbolic representations of certain exemplary embodiments of the present invention (and as such they are not necessarily drawn to scale). In addition, it is to be expressly understood that the relative dimensions and distances depicted in the drawings (and described in the "Detailed Description of the Invention" section) are exemplary and may be varied in numerous ways without departing from the scope of the invention (as defined by the claims). Finally, like reference numerals have been used to designate like features throughout the several views of the drawings.

FIG. 5A is a side perspective view of a three-spool "tape roller" apparatus in accordance with another embodiment of the present invention. The three-spool tape roller apparatus is useful for making multi-layer fire safety tape (i.e., a foam/intumescent layered tape).

FIG. 5B is an enlarged view of a section of the multi-layer fire safety tape (i.e., a foam/intumescent layered tape) shown in FIG. 5A.

FIG. 6A is a side perspective view of a four-spool "tape roller" apparatus in accordance with yet another embodiment of the present invention. The four-spool tape roller apparatus is useful for making multi-layer fire safety tape (i.e., a foam/intumescent/foam layered tape).

FIG. 6B is an enlarged view of a section of the multi-layer fire safety tape (i.e., a foam/intumescent/foam layered tape) shown in FIG. 6A.

DETAILED DESCRIPTION OF THE INVENTION

Figure 1A:
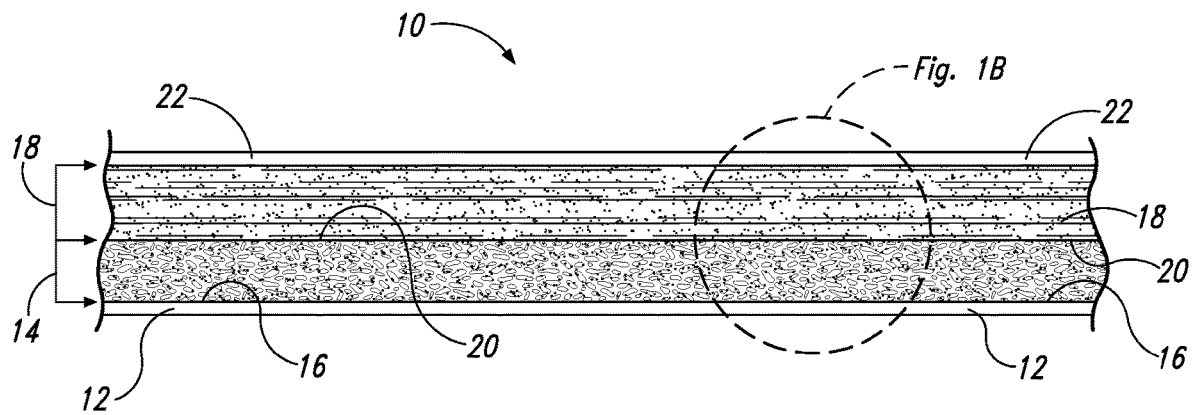
FIG. 1A is an enlarged side view of a flat piece of a multi-layer fire safety tape in accordance with an embodiment of the present invention; it shows a foam/intumescent material layered structure associated with the inventive multi-layer fire safety tape.

In the following detailed description, reference is made to the accompanying drawings, which form a part hereof. In the drawings, similar symbols or markings have been used to identify like or corresponding elements, unless context dictates otherwise. The illustrative embodiments described in the detailed description, drawings, and claims are not meant to be limiting. Other embodiments may be utilized, and other changes may be made, without departing from the spirit or scope of the invention disclosed herein.

Figure 1B:
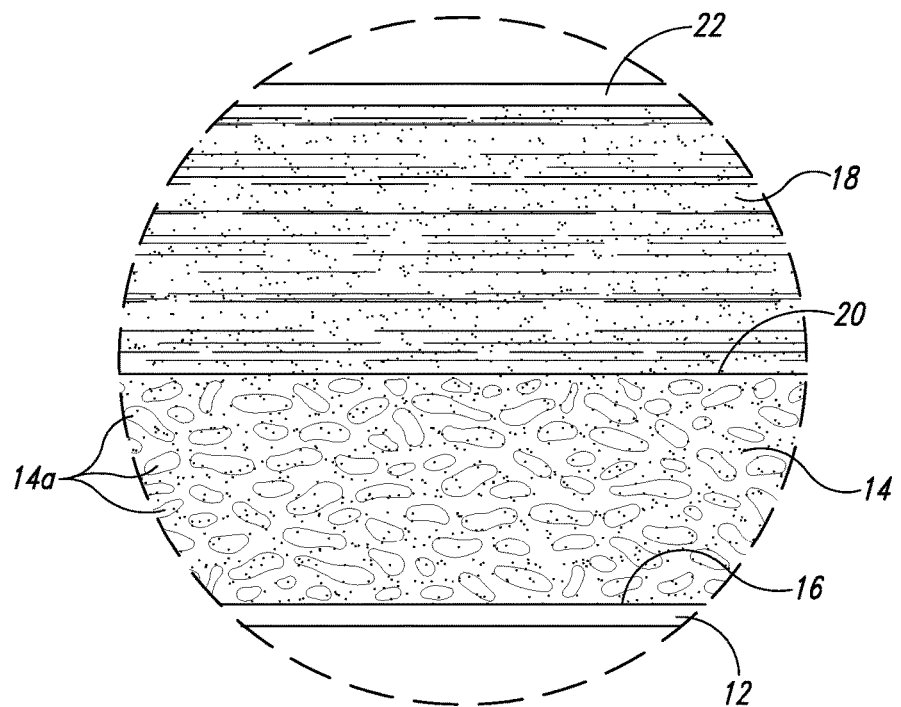
FIG. 1B is a further enlarged view of a portion of the multi-layer fire safety tape shown in FIG. 1A; it better shows various physical features (closed-cells or bubbles, for example) associated with one of the different distinct layers.

Accordingly, and as best shown in FIGS. 1A-B, the present invention in an embodiment is directed to a multi-layer fire safety tape 10 made of, in series (i.e., a "sandwich" of materials), (1) a flexible backing/release layer 12; (2) a flexible closed-cell polymer foam thermal barrier layer 14; (3) a first adhesive interface layer 16 between the backing/release layer 12 and the closed-cell polymer foam thermal barrier layer 14; (4) a flexible intumescent material layer 18; (5) a second adhesive interface layer 20 between the intumescent material layer 18 and the closed-cell polymer foam thermal barrier layer 14; and (6) a flexible outer protective layer 22.

Figure 2A:
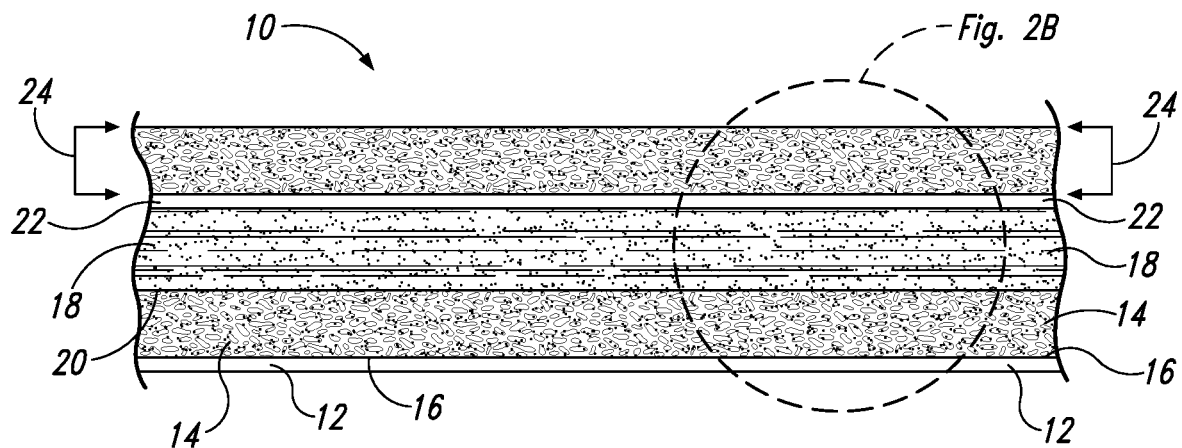
FIG. 2A is an enlarged side view of a flat piece of a multi-layer fire safety tape in accordance with another embodiment of the present invention; it shows a foam/intumescent material/foam layered structure associated with the inventive multi-layer fire safety tape.
Figure 2B:
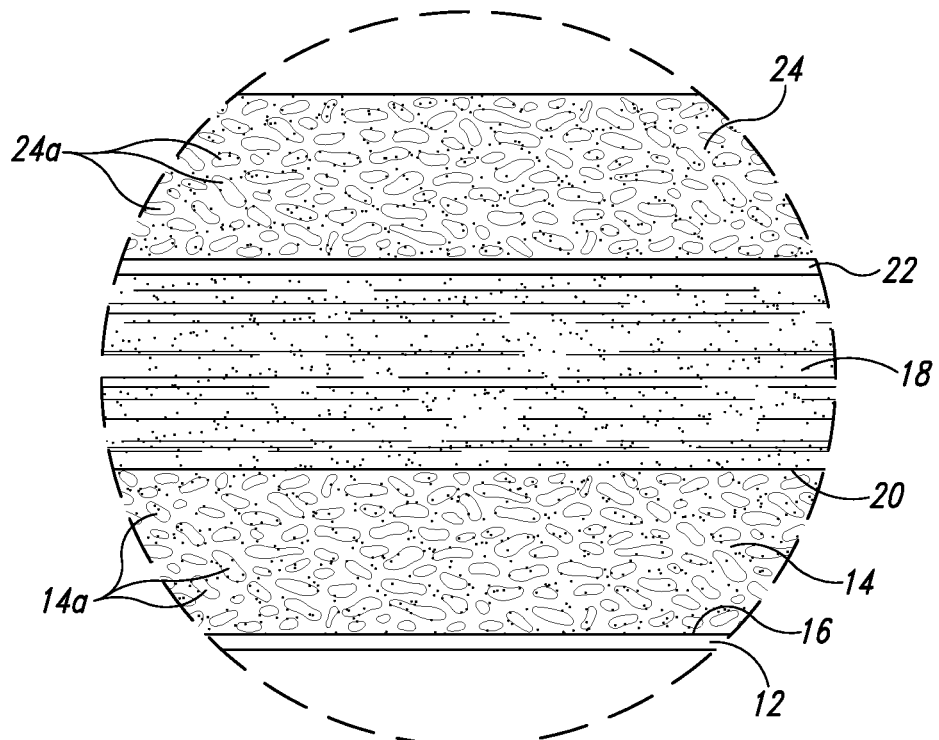
FIG. 2B is a further enlarged view of a portion of the multi-layer fire safety tape shown in FIG. 2A; it better shows various physical features (closed-cells or bubbles, for example) associated with two of the different distinct layers.

In further embodiments and as best shown in FIGS. 2A-B, the multi-layer fire safety tape 10 of the present invention may further comprise a second closed-cell polymer foam layer 24 adjacent to the intumescent material layer 18 and the outer protective layer 22 (which protective layer is optional). The multi-layer fire safety tapes 10 of the present invention may take the form of a multi-layered flat strip (as shown in FIGS. 1A-2B, 5B, and 6B), or may be in the form of a multi-layered roll (as shown in FIGS. 5A and 6A); and, therefore, may be unwound and applied to appropriate building construction joints (not shown) in the field as needed or may be factory pre-applied to tracks (or other framing member) intended for use in wall assemblies.

The flexible backing/release layer 12 is preferably a wax coated release paper (and thus may be easily separated from the flexible closed-cell polymer foam thermal barrier layer 14). In practice, the flexible backing/release layer 12 is manually removed from the multi-layer fire safety tape 10 just prior to the tape's use (application) in either the field (to seal linear construction joints) or at the steel track manufacturing factory (to appropriately position onto tracks and/or other framing members). By removing the flexible backing/release layer 12, the underlying first adhesive interface layer 16 is exposed thereby allowing contact and subsequent adhesion of the flexible closed-cell polymer foam thermal barrier layer 14 directly onto a targeted substrate (e.g., the downwardly extending flanges of a U-shaped track). The first adhesive interface layer 16 is preferably an acrylic based pressure sensitive adhesive; however, other adhesives such as polyurethane-based adhesives would also work and are within the scope of the present invention.

The closed-cell polymer foam thermal barrier layer 14 is preferably a foamed polyolefin having a plurality of internal and uniformly dispersed "closed cells" 14a with diameters ranging from about 100 to about 1,000 microns. A closed-cell foam is one where distinct bubbles of gas are trapped individually within the plastic. The foamed polyolefin is preferably a high-density polyethylene material that has been foamed to a density of about 0.35 g/cm³; it may, however, comprise other polymers such as, for example, polypropylene, polyurethane, and/or polystyrene. The closed-cell polymer foam thermal barrier layer 14 preferably has a thickness ranging from about 0.2 to about 2.5 millimeters, and more preferably about 1.6 millimeters.

The intumescent material layer 18 is composed of an expandable graphite and preferably has a density of about 1.40 g/cm³. The intumescent material layer 18 preferably has a thickness ranging from about 1.0 to about 2.5 millimeters, and more preferably about 1.8 millimeters. In all embodiments, the intumescent material layer 18 never contacts, directly or indirectly, the targeted substrate (e.g., U-shaped header track); rather, the intumescent material layer 18 is always separated apart from, and not on (contacting), the targeted substrate. Importantly, the closed-cell polymer foam thermal barrier layer 14 shields and protects the heat-sensitive intumescent material layer 18 from any heat that may emanate away from the underlying substrate during a fire. Thus, the closed-cell polymer foam thermal barrier layer 14 acts a barrier to heat flow.

The outer protective layer 22 (that is on the intumescent material layer 18) is preferably a resilient and flexible plastic (polyvinyl) film. The outer protective layer 22 shields and protects the underlying intumescent layer from any abrasion (such as, for example, abrasion associated with the cycling of wallboard within a wall assembly). The outer protective layer 22, may, however, be a "skin layer" that is integral to the second closed-cell polymer foam layer. In other words, the outer protective layer 22 is an optional feature. Similarly, the second closed-cell polymer foam layer 24 (having properties and "closed cells" 24a that are substantially the same as those of the closed-cell polymer foam thermal barrier layer 14) is also an optional feature.

With regards to the sealing of linear expansion joints and without necessarily prescribing to any particular scientific theory, the multi-layer fire safety tapes 10 of the present invention are believed to work better than traditional intumescent caulks, sprays and tapes because the closed cells 14a (of the closed-cell polymer foam thermal barrier layer 14) act as tiny insulators that (collectively) retard the flow of heat to the "heat-sensitive" intumescent material layer 18. Because the flow of heat to the intumescent material layer 18 is retarded, it takes substantially longer for the intumescent material layer 18 to begin and finish its swell (expansion) cycle, which, in turn, lengthens the amount of time it takes for heat to be transmitted through the sealed joint system.

The multi-layer fire safety tapes 10 disclosed herein are particularly useful when applied to sheet metal tracks (and other framing members) used to construct wall assemblies in buildings because these composite structures have been shown to pass UL's stringent fire tests. In these embodiments of the present invention, the flexible closed-cell polymer foam thermal barrier layer 14 is in physical contact with, and supported by, the track (and, thus, is considered to be "on" the track), whereas the flexible intumescent material layer 18 is positioned away from (i.e., is not "on") the track.

Figure 3:
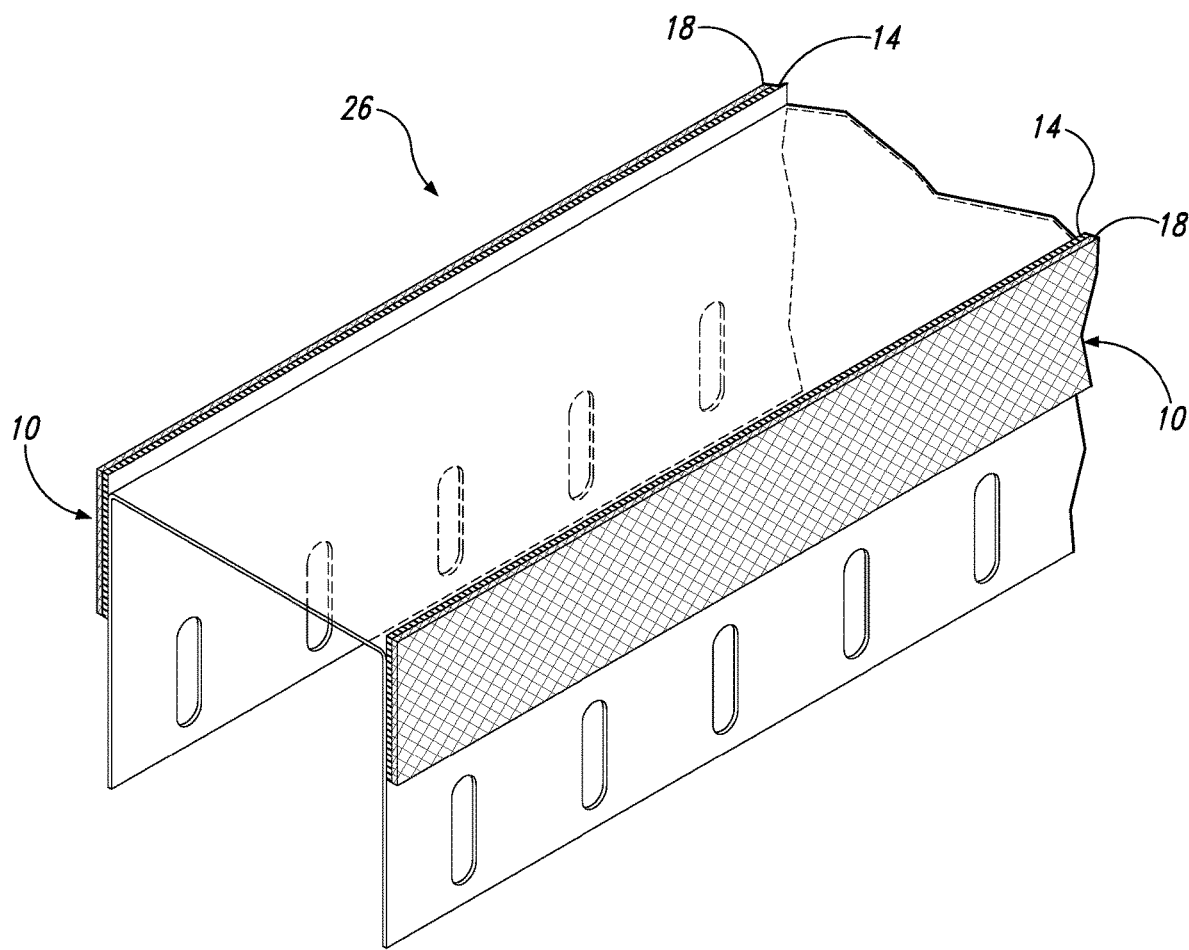
FIG. 3 is an elevated perspective view of a section of a generally U-shaped slotted header track having a multi-layer fire safety tape positioned on the upper sections of the downwardly extending flanges of the track in accordance with another embodiment of the present invention.
Figure 4:
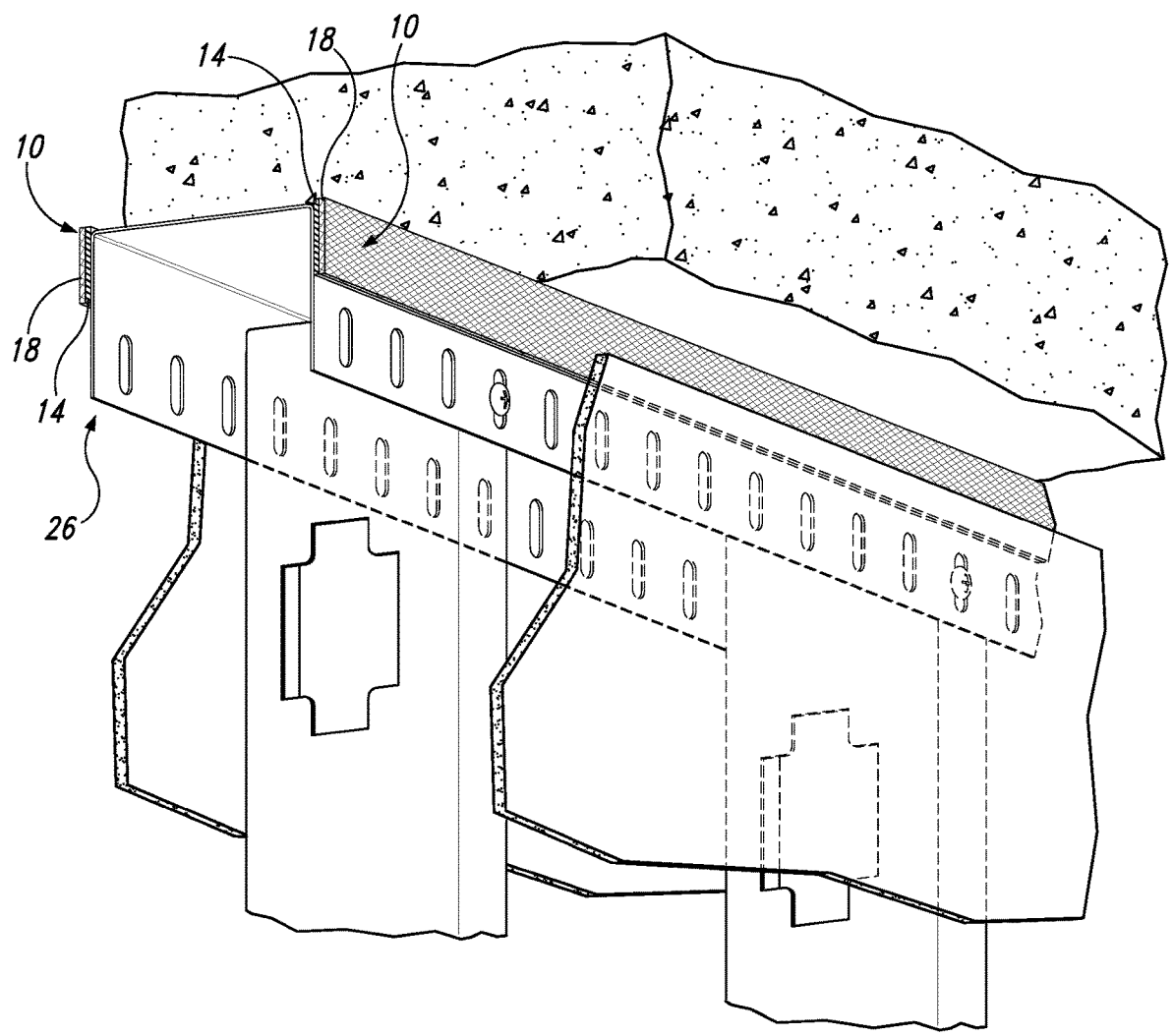
FIG. 4 is an elevated perspective view of a dynamic head-of-wall assembly that includes, as part of the wall assembly, the generally U-shaped slotted header track having a multi-layer fire safety tape positioned thereon as shown in FIG. 3.

Thus, and in still other further embodiments and as best shown in FIGS. 3 and 4, the present invention is directed to header tracks 26 (generally U-shaped sheet metal header tracks, for example, as shown in FIG. 3) and other framing members (control joint backers and L-shaped members, for example—not shown) having the inventive multi-layer fire safety tape 10 applied thereto, as well as to wall assemblies that incorporate such components (as shown in FIG. 4).

In still other embodiments and as best shown in FIGS. 5A and 6A, the present invention is directed to apparatuses and methods useful for making a multi-layer fire safety tape 10. A first method (FIG. 5A) comprises at least the steps of providing a first roll 13 of a flexible double-coated closed-cell polymer foam sheet (or strip) 14 about a first spool 13a, wherein the double-coated closed-cell polymer foam sheet (or strip) 14 is on an interleaving first wound backing/release sheet (or strip) (not visible); providing a second roll 15 of a flexible intumescent material sheet (or strip) 18 about a second spool 15a, wherein the wound intumescent material sheet (or strip) 18 includes an outer flexible protective layer (optional—not shown); providing a third spool 17; connecting the double-coated closed-cell polymer foam sheet (or strip) 14 to the intumescent material sheet (or strip) 18 at (or near) the third spool 17; winding about the third spool 17 the double-coated closed-cell polymer foam sheet (or strip) 14 together with the intumescent material sheet (or strip) 18, while unwinding the first and second rolls 13, 15, to thereby yield a roll 10a of the multi-layer fire safety tape 10.

The method may further comprise (FIG. 6A) the step of providing a third roll 19 of a flexible single side-coated closed-cell polymer foam sheet (or strip) 24 about a fourth spool 19a; connecting the single sided-coated closed-cell polymer foam sheet (or strip) 24 to the intumescent material sheet (or strip) 18 and to the single side-coated closed-cell polymer foam sheet (or strip) 14 at (or near) the third spool 17; and winding about the third spool 17 the double-coated closed-cell polymer foam sheet (or strip) 14 together with the intumescent material sheet (or strip) 18 and together with the single side-coated closed-cell polymer foam sheet (or strip) 24, while unwinding the first and second and third rolls 13, 15, 19, to thereby yield a roll 10*a* of the multi-layer fire safety tape 10.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing descriptions, and all changes that come within the meaning and range of equivalency of the claims are to be embraced within their scope.

What is claimed is:

1. A bi-layer fire safety adhesive tape comprising a flexible first single layer closed-cell polymer foam strip adjoined via an adhesive to a flexible second single layer expandable graphite material strip to yield the bi-layer fire safety adhesive tape.

2. The bi-layer fire safety tape of claim 1, further comprising an adhesive layer on the closed-cell polymer foam strip on the side of the closed-cell polymer foam strip opposite from the expandable graphite material strip.

3. The bi-layer fire safety tape of claim 2 wherein the adhesive layer is composed of an acrylic-based pressure sensitive adhesive.

4. The bi-layer fire safety tape of claim 2, further comprising a flexible backing/release layer adjacent to the adhesive layer.

5. The bi-layer fire safety tape of claim 4 wherein the flexible backing/release layer is a strip of wax coated release paper.

6. The bi-layer fire safety tape of claim 2, further comprising a flexible outer protective layer adjacent to the expandable graphite material layer strip.

7. The bi-layer fire safety tape of claim of claim 6 wherein the outer protective layer is a polyvinyl film.

8. The bi-layer fire safety tape of claim 1 wherein the closed-cell polymer foam strip has a thickness ranging from about 1.0 to about 2.0 millimeters, and wherein the expandable graphite material strip has a thickness ranging from about 1.0 to about 2.5 millimeters.

9. The bi layer fire safety tape of claim 1 wherein the closed-cell polymer foam strip is an expanded high-density polyethylene that has a density of about 0.35 g/cm$^3$.

10. The bi layer fire safety tape of claim 1 wherein the expandable graphite material strip has a density of about 1.40 g/cm$^3$.

11. A sheet metal framing member having a piece of bi-layer fire safety adhesive tape thereon, wherein the bi-layer fire safety adhesive tape comprises a flexible first single layer closed-cell polymer foam strip adjoined via an adhesive to a flexible second single layer expandable graphite material strip.

12. The sheet metal framing member of claim 11 wherein the sheet metal framing member is a generally U-shaped header track.

* * * * *